United States Patent [19]
Yano

[11] Patent Number: 4,885,742
[45] Date of Patent: Dec. 5, 1989

[54] NODE APPARATUS AND COMMUNICATION NETWORK

[75] Inventor: Takashi Yano, Tokyo, Japan

[73] Assignee: Ricoh Company, Ltd., Tokyo, Japan

[21] Appl. No.: 302,258

[22] Filed: Jan. 27, 1989

[30] Foreign Application Priority Data

Jan. 28, 1988 [JP] Japan .................................. 63-15948

[51] Int. Cl.$^4$ ............................. H04J 3/02; H04J 3/24
[52] U.S. Cl. .................................. 370/85.2; 370/94.1; 340/825.5
[58] Field of Search ...................... 370/60, 85, 88, 94; 340/825.02, 825.5, 825.51

[56] References Cited

U.S. PATENT DOCUMENTS

| 4,347,498 | 8/1982 | Lee et al. | 340/825.02 |
| 4,445,171 | 4/1984 | Neches | 370/94 |
| 4,740,954 | 4/1988 | Cotton et al. | 370/60 |
| 4,811,337 | 3/1989 | Hart | 340/825.02 |
| 4,814,979 | 3/1989 | Neches | 340/825.02 |

FOREIGN PATENT DOCUMENTS 5840384 11/1980 Japan .
5864847 10/1981 Japan .

*Primary Examiner*—Robert L. Griffin
*Assistant Examiner*—Wellington Chin
*Attorney, Agent, or Firm*—Oblon, Spivak, McClelland, Maier & Neustadt

[57] ABSTRACT

A node apparatus is used in a communication network having a hierarchical structure and transmission paths each coupling one node apparatus to another node apparatus or a terminal device. The node apparatus has at least one high order direction port, low order direction ports, and a control unit for controlling the coupling of the high order direction port and the low order direction ports. When signals are transmitted from the terminal devices approximately at the same time, one of the signals which first reaches the node apparatus provided in a highest order layer is broadcasted within the communication network and remaining signals are eliminated.

27 Claims, 11 Drawing Sheets

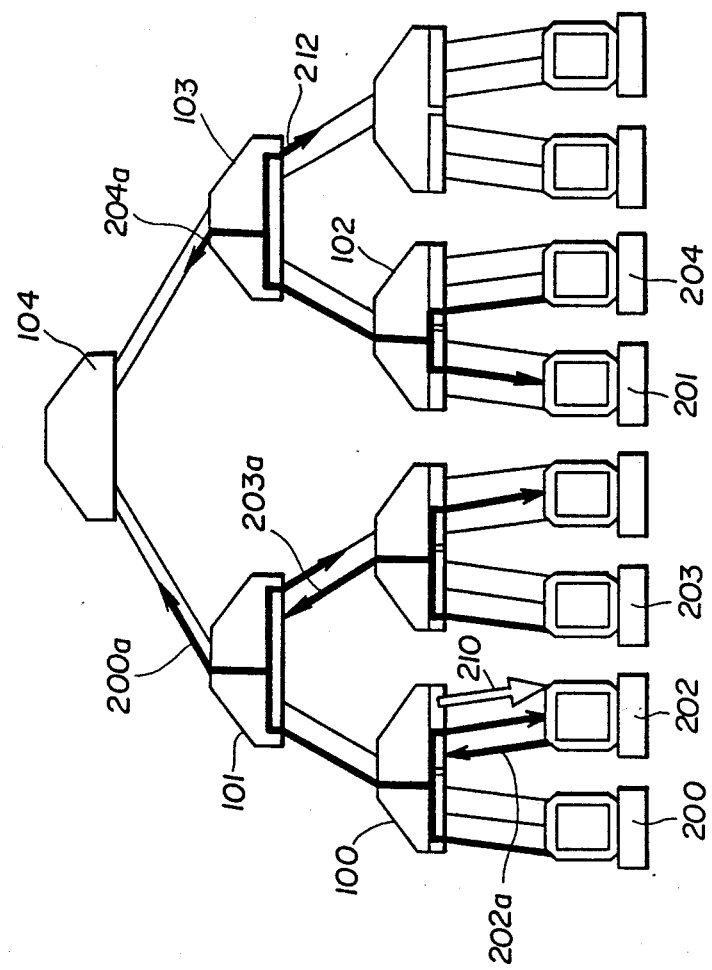

NODE APPARATUS AND COMMUNICATION NETWORK

BACKGROUND OF THE INVENTION

The present invention generally relates to node apparatuses and communication networks, and more particularly to a node apparatus which is effectively applicable to a network layer and an OSI physical layer of a local area network, for example, and a communication network having such a node apparatus.

A throughput versus delay time characteristic shown in FIG. 1 is often used to evaluate the performance of a bus type local area network (LAN). This characteristic is a relationship between a transmitted communication quantity (that is, traffic) and a waiting time until the communication is completed. Generally, in the bus type LAN, the delay time is small when the generated traffic is low but the delay time is large when the generated traffic is high because it is necessary to wait until a communication network which is to be used in common becomes available. In FIG. 1, a curve I shows a throughput versus delay time characteristic of a carrier sense multiple access with collision detection (CSMA/CD) system LAN and a curve II shows a throughput versus delay time characteristic of a token ring system LAN. The CSMA/CD system LAN and the token ring system LAN are typical LANs.

For example, the CSMA/CD system LANs such as Ethernet and star-shaped LANs prescribed under IEEE 802.3 have simple protocols, and the communication efficiency is high because the delay time is small when the traffic is low. However, when the traffic is high, many collisions occur and the throughput becomes restricted. This tendency of the restricted throughput becomes notable as the traffic increases, and the throughput eventually decreases when the traffic exceeds a certain limit.

The throughput of the CSMA/CD system LAN becomes restricted as described above for the following reasons. That is, the probability that packet collisions occur becomes high as the traffic becomes high, and the delay time increases due to re-transmissions of packets. In addition, packets which are destroyed by the collisions occupy the communication network meaninglessly and the capacity of the communication network is reduced thereby. Accordingly, when the traffic becomes high and is no longer negligible with respect to the capacity of the communication network, the throughput then decreases. In order to prevent these problems, it is necessary to design the system to run at a data transmission rate considerably higher than an anticipated traffic, but this would require expensive apparatuses and transmission paths.

In the token system LANs such as the token bus system LAN prescribed under IEEE 802.4 and the token ring system LAN prescribed under IEEE 802.5, the increase in the delay time as the traffic increases is small compared to that of the CSMA/CD system LAN and the communication efficiency is high. But the delay time does not become small even when the traffic is low. In addition, the protocol is complex, and the token system LANs require complex and expensive apparatuses. Therefore, it is impossible to employ a high data transmission rate when inexpensive apparatuses are used.

A Japanese Published Patent Application No. 58-40384 discloses a CSMA/CD system in which one communication is completed without damaging the packet even when a collision occurs. Hence, the increase in the delay time is small even when the traffic is high, and the communication efficiency is high. However, the construction of the apparatuses is still complex because the collision is detected by comparing addresses of an output packet and an input packet thereof. Moreover, this system does not satisfy the IEEE 802.3 standards. In communication systems, one important factor is the compatibility with the existing systems, and the product value is poor when the existing standards cannot be satisfied.

SUMMARY OF THE INVENTION

Accordingly, it is a general object of the present invention to provide a novel and useful node apparatus and communication network in which the problem described above are eliminated.

Another and more specific object of the present invention is to provide a node apparatus for a communication network having a hierarchical structure and a plurality of transmission paths each coupling one node apparatus to another node apparatus or a terminal device, comprising at least one high order direction port having input and output channels for coupling the node apparatus to an arbitrary node apparatus which is provided in a layer which is higher in order than a layer in which the node apparatus is provided, a plurality of low order direction ports respectively having input and output channels for coupling the node apparatus to an arbitrary node apparatus or an arbitrary terminal device which is provided in a layer which is lower in order than the layer in which the node apparatus is provided, and control means for controlling coupling of the high order direction port and the low order direction ports. When no signal is received at the input channel of the high order direction port and a signal is first received at the input channel of one of the low order direction ports, the control means couples the input channel of the one low order direction port to the output channels of remaining low order direction ports and the high order direction port and disconnecting the input channels of the remaining low order direction ports from the output channels of all of the low order direction ports and the high order direction port. When a signal is first received at the input channel of the high order direction port, the control means couples the input channel of the high order direction port to the output channels of all of the low order direction ports and disconnecting the input channels of all of the low order direction ports from the output channels of all of the low order direction ports and the high order direction port regardless of whether or not a signal is received at an input channel of one of the low order direction ports. According to the node apparatus of the present invention, it is possible to maintain compatibility with the existing communication systems, and the performance of the communication network can be improved even though the construction of the node apparatus is relatively simple.

Still another object of the present invention is to provide a communication network having a hierarchical structure comprising a plurality of node apparatuses provided in a different layers of the hierarchical structure, a plurality of terminal devices, and a plurality of transmission paths each coupling one node apparatus to another node apparatus or one terminal device, where each of the node apparatuses comprise at least one high order direction port having input and output channels for coupling the node apparatus to an arbitrary node apparatus which is provided in a layer which is higher in order than a layer in which the node apparatus is provided, a plurality of low order direction ports respectively having input and output channels for coupling the node apparatus to an arbitrary node apparatus or an arbitrary terminal device which is provided in a layer which is lower in order than the layer in which the node apparatus is provided, and control means for controlling coupling of the high order direction port and the low order direction ports. When no signal is received at the input channel of the high order direction port and a signal is first received at the input channel of one of the low order direction ports, the control means couples the input channel of the one low order direction port to the output channels of remaining low order direction ports and the high order direction port and disconnecting the input channels of the remaining low order direction ports from the output channels of all of the low order direction ports and the high order direction port. When a signal is first received at the input channel of the high order direction port, the control means couples the input channel of the high order direction port to the output channels of all of the low order direction ports and disconnecting the input channels of all of the low order direction ports from the output channels of all of the low order direction ports and the high order direction port regardless of whether or not a signal is received at an input channel of one of the low order direction ports. The node apparatuses cooperate so that when a plurality of signals are transmitted from the terminal devices approximately at the same time one of the signals which first reaches a predetermined node apparatus provided in a highest order layer is broadcasted within the communication network and remaining signals are eliminated. According to the communication network of the present invention, it is possible to improve the performance of the communication network while maintaining compatibility with the existing communication systems.

Other objects and further features of the present invention will be apparent from the following detailed description when read in conjunction with the accompanying drawings.

BRIEF DESCRIPTION OF THE DRAWINGS

FIGS. 8A, 8B and 8C are system block diagrams respectively for explaining a modified operation of the node apparatus in the communication network shown in FIG. 2.

DETAILED DESCRIPTION

The node apparatus and communication network according to the present invention are designed so that one communication is completed in the CSMA/CD system even when a collision occurs. In this respect, the present invention is similar to that disclosed in the Japanese Published Patent Application No. 58-40384 described before. Accordingly, there is no need to re-transmit a packet and there is no increase in the delay time which would be caused by such a re-transmission. In addition, packets destroyed by the collisions will not occupy the communication network meaninglessly. As a result, it is possible to prevent a decrease in the throughput. In a specific embodiment of the present invention, the communication network has a tree-shaped hierarchical structure in which a first received packet at a highest order node apparatus is regarded valid and broadcasted within the communication network while other packets are regarded invalid and eliminated so as to prevent the first received packet from becoming destroyed by collisions. In the present specification, the state of the packets which are regarded invalid and eliminated are also referred to as a "collision".

In the Japanese Published Patent Application No. 58-40384, a terminal device is designed to discriminate whether the packet transmitted therefrom is valid or invalid, that is, whether or not a collision occurred. The discrimination is carried out by comparing a packet being transmitted and a packet received from the highest order node apparatus, and the collision is detected when the two compared packets differ. In other words, although the system according to the Japanese Published Patent Application No. 58-40384 is a CSMA/CD system, this system does not satisfy the IEEE 802.3 standards. For this reason, it is necessary to design a network interface unit exclusively for this system, and the construction of the apparatus becomes complex because the full duplex communication must be supported.

But according to the present invention, the collision is detected by detecting whether or not a signal exists at an input port corresponding to an output port from which a signal is transmitted. Hence, this collision detection can be made in a node apparatus, and it is possible to maintain compatibility with the existing system by satisfying IEEE 802.3 standards.

Figure 2:
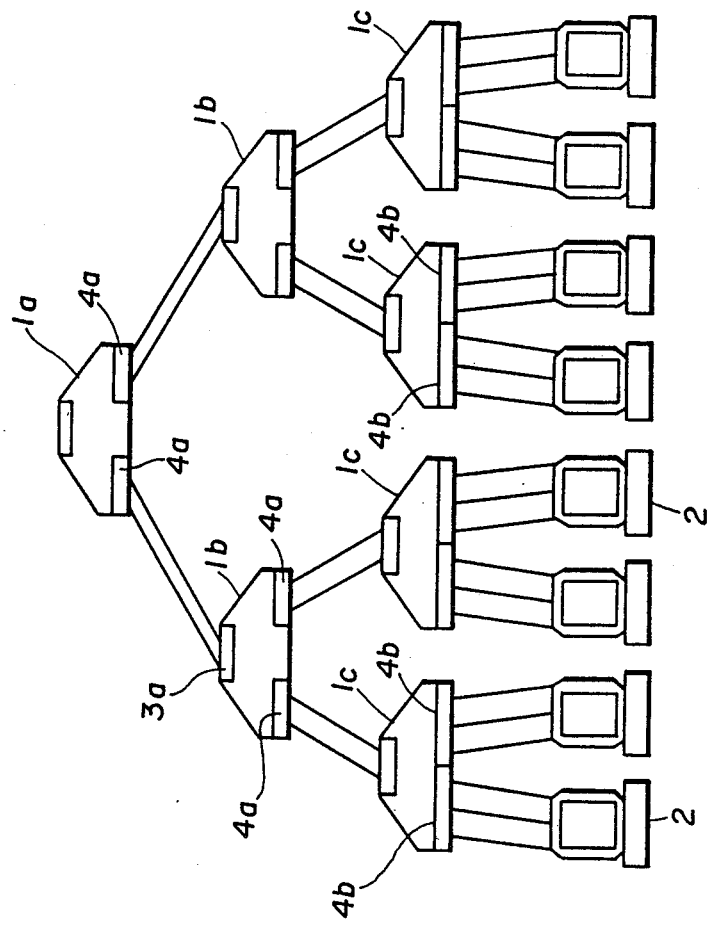
FIG. 2 is a system block diagram showing an embodiment of a communication network according to the present invention.

FIG. 2 shows an embodiment of a communication network according to the present invention. For example, this embodiment is applied to a communication network having a tree-shaped hierarchical structure of three layers. Two intermediate node apparatuses 1b in an intermediate layer are provided under a highest order node apparatus 1a is a highest order layer, and two lowest order node apparatuses 1c in a lowest order layer are provided under each intermediate node apparatus 1b. Two terminal devices 2 are coupled to each lowest order node apparatus 1c. For example, an optical transmission path is used to couple the node apparatuses 1a, 1b, and 1c and the terminal devices 2. The node apparatuses 1a, 1b and 1c may have identical constructions, and the number of node apparatuses, the number of terminal devices and the number of layers are not limited to those of this embodiment. It is of course possible to form a communication network by a single node apparatus. Further, it is possible to couple a terminal device to an arbitrary node apparatus in any layer.

Figure 3:
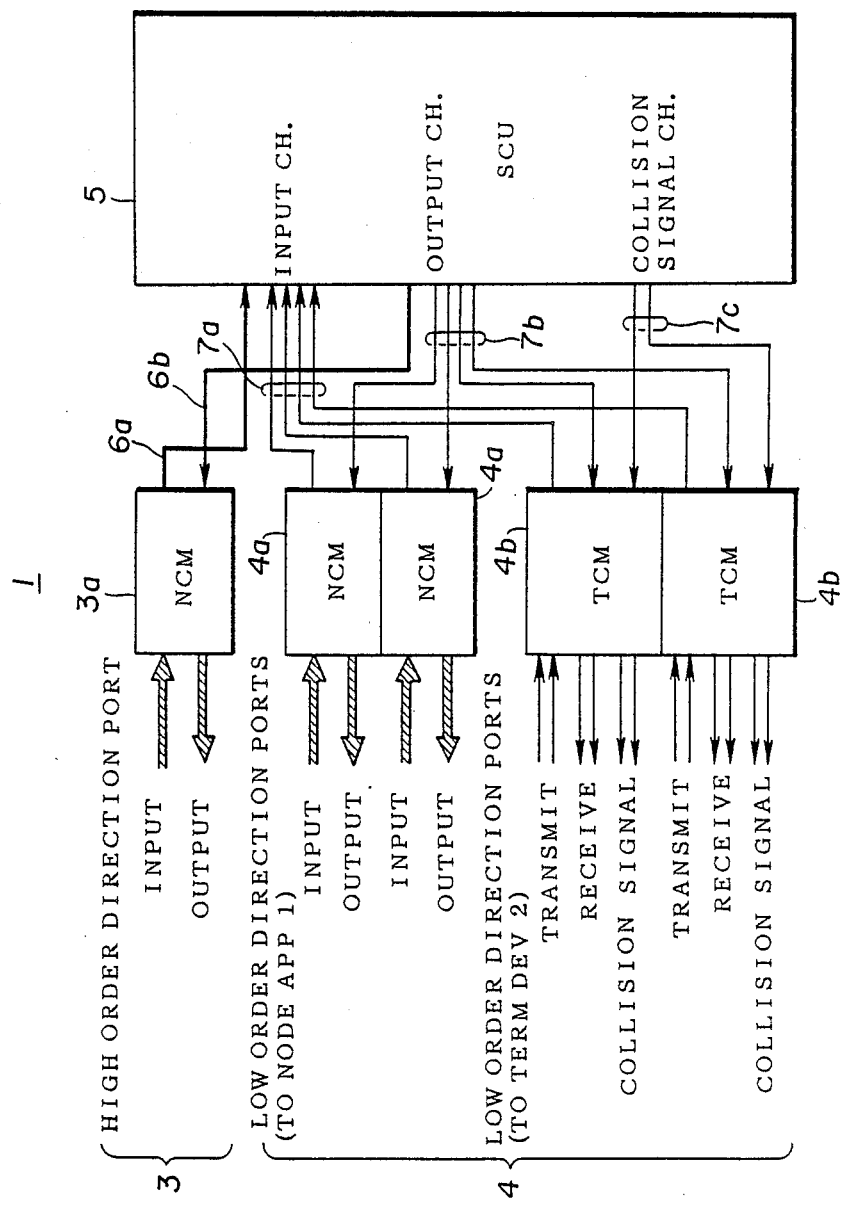
FIG. 3 is a system block diagram showing an embodiment of a node apparatus according to the present invention and applicable to the communication network shown in FIG. 2.

FIG. 3 shows an embodiment of a node apparatus according to the present invention and applicable to the communication network shown in FIG. 2. In FIG. 3, a node apparatus 1 may be used as any of the node apparatuses 1a, 1b and 1c shown in FIG. 2. In this embodiment shown in FIG. 3, the node apparatus 1 is a 4-port node apparatus.

The node apparatus 1 has a node control module 3a which is used as a high order direction port 3 having high order direction input and output channels, a pair of node control modules 4a used as a pair of low order direction ports 4 respectively having low order direction input and output channels, a pair of terminal control modules 4b used as a pair of low order direction ports 4 respectively having low order direction input and output channels, and a switching control unit 5. The switching control unit 5 controls the node control modules 3a and 4a and the terminal control modules 4b. The high order direction port 3 is constituted by the node control module 3a, while the low order direction ports 4 are constituted by an arbitrary combination of the node control modules 4a and the terminal control modules 4b. In other words, the node control module 4a and the terminal control module 4b are interchangeable and are provided depending on the transmission path or depending on whether or not a terminal device is coupled in the low order direction.

For example, the intermediate node apparatus 1b shown in FIG. 2 has two node control modules 4a while the lowest order node apparatus 1c has two terminal control modules 4b in place of the node control modules 4a. Hence, the low order direction ports 4 are made up of modules respectively having one or a plurality of ports. The number of ports is of course not limited to four and an arbitrary number of ports may be provided.

The switching control unit 5 has a high order direction input channel 6a and a high order direction output channel 6b, and the switching control unit 5 is coupled to the node control module 3a through these input and output channels 6a and 6b. The switching control unit 5 also has low order direction input channels 7a and low order direction output channels 7b, and the switching control unit 5 is coupled to the node control modules 4a through these input and output channels 7a and 7b. Furthermore, the switching control unit 5 has collision signal channels 7c, and the switching control unit 5 is coupled to the terminal control modules 4b through the input and output channels 7a and 7b and the collision signal channels 7c.

For example, the low order direction ports 4 of the highest order node apparatus 1a and the intermediate node apparatus 1b are constituted by an appropriate combination of the node control module 4a and the terminal control module 4b. Similarly, the low order direction ports 4 of the lowest order node apparatus 1c are constituted solely by the terminal control modules 4b. A high order direction port 3 of the highest order node apparatus 1a is not used.

Figure 4:
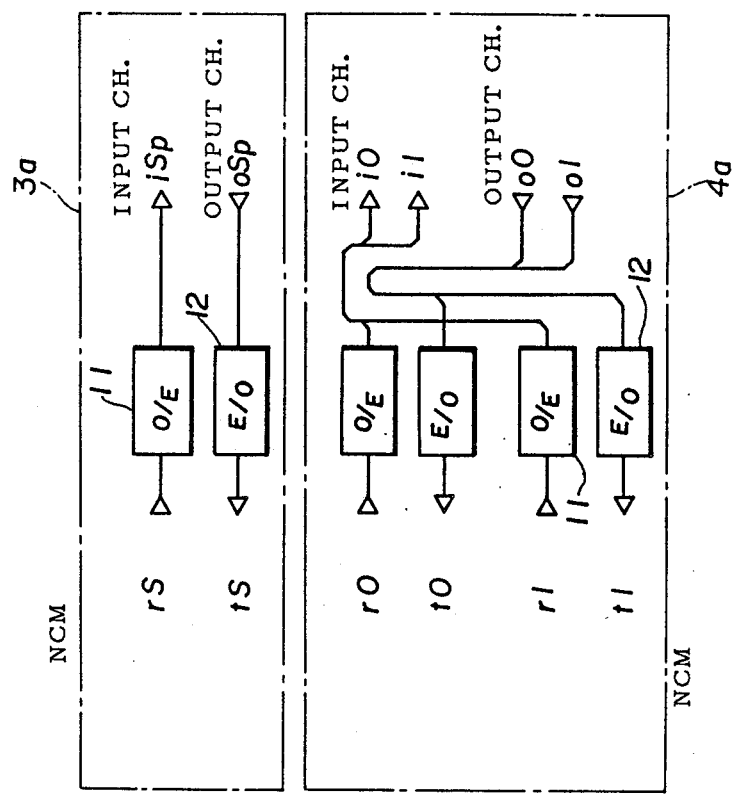
FIG. 4 is a system block diagram showing an embodiment of node control modules.

FIG. 4 shows an embodiment of the node control module 3a and the node control module 4a. As may be seen from FIG. 4, the node control module 3a has an optic-electric (O/E) data link 11 and a electric-optic (E/O) data link 12 which are connected as shown, while the node control module 4a has O/E data links 11 and E/O data links 12 which are connected as shown. It is of course possible to constitute the node control modules 3a and 4a by RS422 standard transmitter/receivers.

Figure 5:
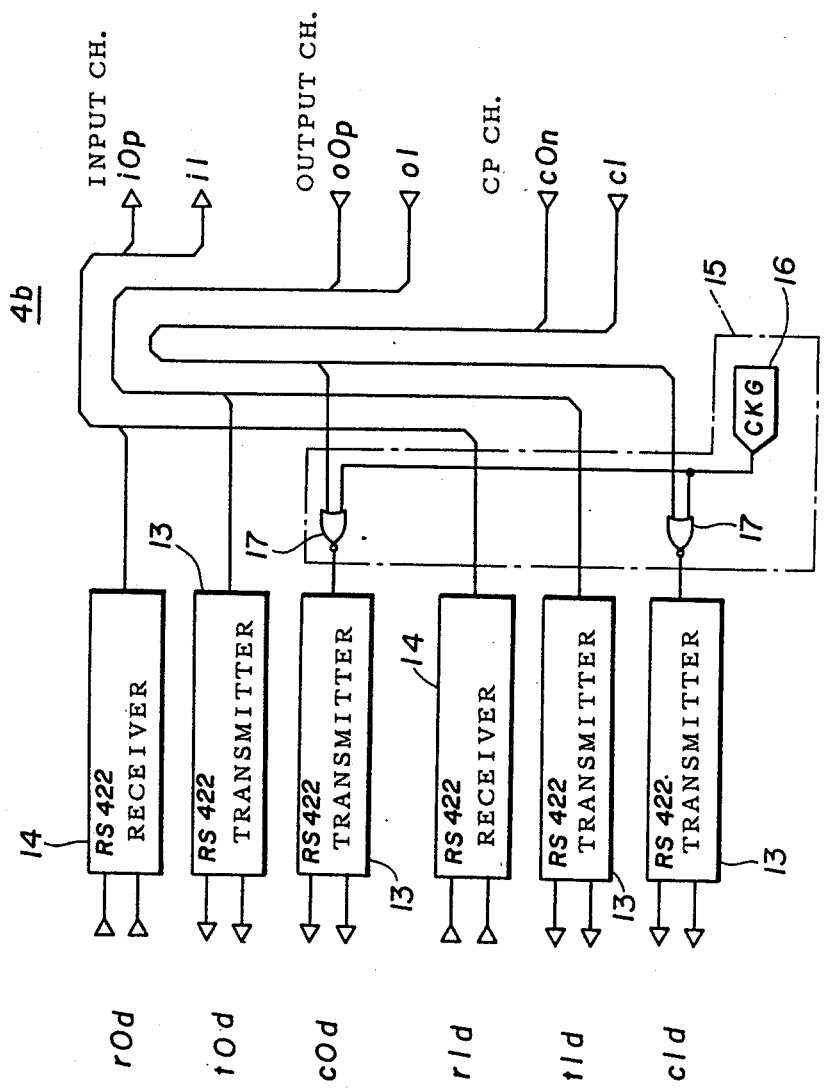
FIG. 5 is a system block diagram showing an embodiment of a terminal control module.

FIG. 5 shows an embodiment of the terminal control module 4b. The terminal module 4b has RS422 standard transmitters 13 and RS422 standard receivers 14 for physically converting input and output signals of the terminal control module 4b and input and output signals of the terminal device 2, and a collision signal transmitting part 15 for converting an output collision signal of the switching control unit 5 into a signal in conformance with a system employed by a network interface unit of the terminal device 2. The collision signal will also be referred hereunder as a first predetermined signal. The collision signal transmitting part 15 has a clock generating circuit 16 and two NOR circuits 17 which are connected as shown. The terminal control module 4b has the interfaces for the input and output signals and the collision signal designed depending on the system employed by the network interface unit of the terminal device 2 which is coupled to the terminal control module 4b.

Figure 6:
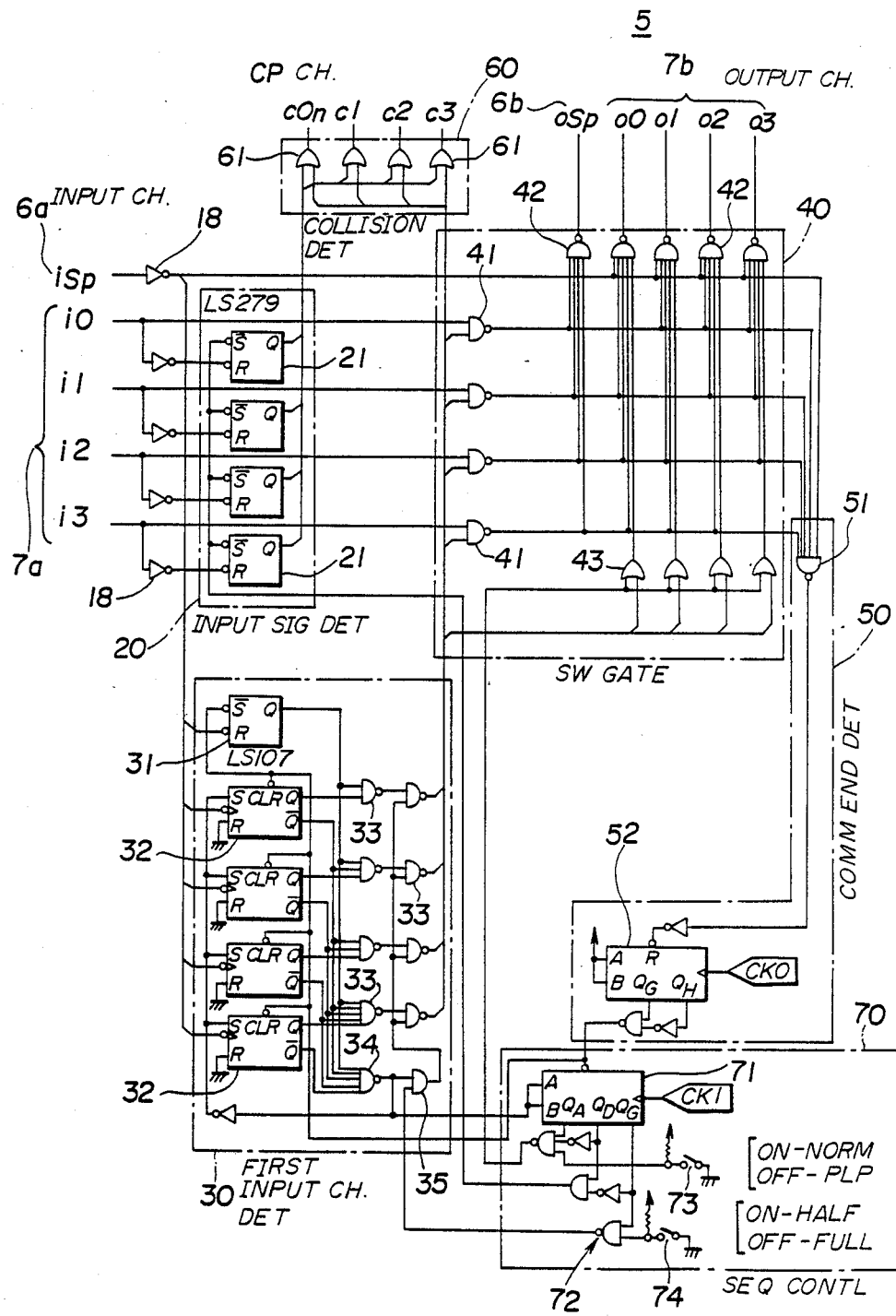
FIG. 6 is a system circuit diagram showing an embodiment of a switching control unit.

FIG. 6 shows an embodiment of a switching control unit 5. The switching control unit 5 generally has an input signal detecting part 20, a first input channel detecting part 30, a switching gate part 40, a communication end detecting part 50, a collision detecting part 60, and a sequence control part 70. A signal from the high order direction input channel 6a is inverted in a corresponding inverter 18 and supplied to the input signal detecting part 20, the first input channel detecting part 30, the switching gate part 40 and the communication end detecting part 50. Signals from the low order direction input channels 7a are inverted by the corresponding inverters 18 and are supplied to the input signal detecting part 20, the switching gate part 40 and the communication end detecting part 50. Output signals of the collision detecting part 60 are supplied to the terminal control module 4b. The sequence control part 70 controls the input channel detecting part 30 and the switching gate part 40 responsive to a control signal from the first input channel detecting part 30.

As shown in FIG. 6, the input signal detecting part 20 has four latch circuits 21 for detecting the existence of signals from the low order direction input channels 7a and for storing the detected signals.

The first input channel detecting part 30 generally has a latch circuit 31, four flip-flops 32, a group of NAND gates 33 for assigning priorities to signals when signals are received at the low order direction input channels 7a approximately at the same time, a 5-input NAND gate 34 for prohibiting input signals other than a first received input signal when the first received input signal is detected, and an AND gate 35. The first input channel detecting part 30 detects and stores a first receiving input channel which receives a signal first of the low order direction input channels 7a, and also has a function of assigning priority to an input signal from the high order direction input channel 6a when it is received. When there is an input signal to the high order direction input channel 6a, a low order direction input channel 7a will not be treated as a first receiving input channel even when the low order direction input channel 7a receives the signal first. The AND gate 35 is connected to an output side of the 5-input NAND gate 34 so as to enable all of the input channels to receive a signal responsive to a control signal from the sequence control part 70.

The switching gate part 40 has four NAND gates 41, five NAND gates 42, and four OR gates 43. The switching gate part 40 connects the first receiving input channel or the high order direction input channel 6a to output channels other than an output channel corresponding thereto based on a signal from the first input channel detecting part 30.

The communication end detecting part 50 has a 5-input NAND gate 51 and a shift register 52. In this embodiment, the communication end detecting part 50 detects an end of the communication when a signal ceases in both the first receiving input channel and the high order direction input channel 6a. When the communication end detecting part 50 detects the end of the communication, the four latch circuits 21 of the input signal detecting part 20, the latch circuit 31 and the four flip-flops 32 of the first input channel detecting part 30, and a shift register 71 of the sequence control part 70 are reset to initialize the switching control unit 5.

The collision detecting part 60 has four OR circuits 61. When both the output signals of the input signal detecting part 20 and the first input channel detecting part 30 have a low level, the signal level at a collision signal channel 7c coupled to the terminal control module 4b and corresponding to the input channel which received an input signal other than the first received input signal is set to a low level by the collision detecting part 60. This low-level signal from the collision signal channel 7c is the collision signal (or first predetermined signal).

The sequence control part 70 has the shift register 71, gate circuits 72, and switches 73 and 74. The switch 73 is a manual switch for preventing a decoder included in the network interface unit of the terminal device 2 from synchronizing in phase to a preamble of a packet, and the sequence control part 70 has this phase lock prevent (PLP) function when the switch 73 is OFF. Otherwise, the switch 73 is normally ON. The switch 74 is a manual switch for selecting one of a full duplex communication and a half duplex communication, and the sequence control part 70 is set for the full duplex communication and the half duplex communication when the switch 74 is OFF and ON, respectively.

The sequence control part 70 sets the output signal levels of the OR gates 41 of the switching gate part 40 to the low level for a first predetermined time starting from the detection of the first received input signal so as to output a high-level signal from all of the low order direction output channels 7b excluding an output channel corresponding to the first receiving input channel. This high-level signal will also be referred hereunder as a second predetermined signal (212 shown in FIG. 8A). In addition, when a time of approximately two times the first predetermined time elapses from the detection of the first received input signal, the sequence control part 70 sets all of the output signals of the first input channel detecting part 30 to the high level. Accordingly, the full duplex communication is enabled.

In this embodiment, the first predetermined time is set approximately equal to a network time constant. In other words, the first predetermined time starts from the detection of the first received input signal at the low order direction input port 4 and is set approximately equal to a propagation delay time for a return trip covering a maximum tolerable distance between the highest order node apparatus 1a and the lowest order node apparatus 1c which is furthest away from the highest order node apparatus 1a.

In addition, the second predetermined time is set approximately equal to a link time constant of the communication network. The second predetermined time starts from the detection of the signal at the high order direction input port 3 of the node apparatus 1 and there is no input signal from a terminal device other than the receiving terminal device after this second predetermined time. The second predetermined time is set approximately equal to a propagation delay time for a one-way trip between two adjacent node apparatuses which are most distant from each other. Accordingly, a time which is approximately two times the first predetermined time includes both the first and second predetermined times.

First, a description will be given of a fundamental operation of the switching control unit 5. For convenience' sake, the switches 73 and 74 are respectively turned ON.

When an input signal is received at the high order direction input channel 6a regardless of whether or not an input signal is received at the low order direction input channels 7a and the input signal received at the high order direction input channel 6a is the first received input signal, the first input channel detecting part 30 sets all of the output signals thereof to the low level. Hence, the switching gate part 40 prohibits all inputs from the low order direction input channels 7a. When a signal is received at a low order direction input channel 7a in this state, the input signal detecting part 20 sets a corresponding output thereof to the low level. As a result, the collision detecting part 60 outputs the collision signal to a corresponding collision signal channel 7c.

When an input signal is received at one of the low order direction input channels 7a and this input signal is the first received input signal, the first input channel detecting part 30 sets a corresponding output to the high level and sets the remaining outputs to the low level. Hence, the switching gate part 40 prohibits the inputs from the low order direction input channels 7a other than the first receiving input channel. When a signal is received at a low order direction input channel 7a in this state, the input signal detecting part 20 sets a corresponding output to the low level, and the collision detecting part 60 outputs the collision signal to a corresponding collision signal channel 7c.

Figure 7A:
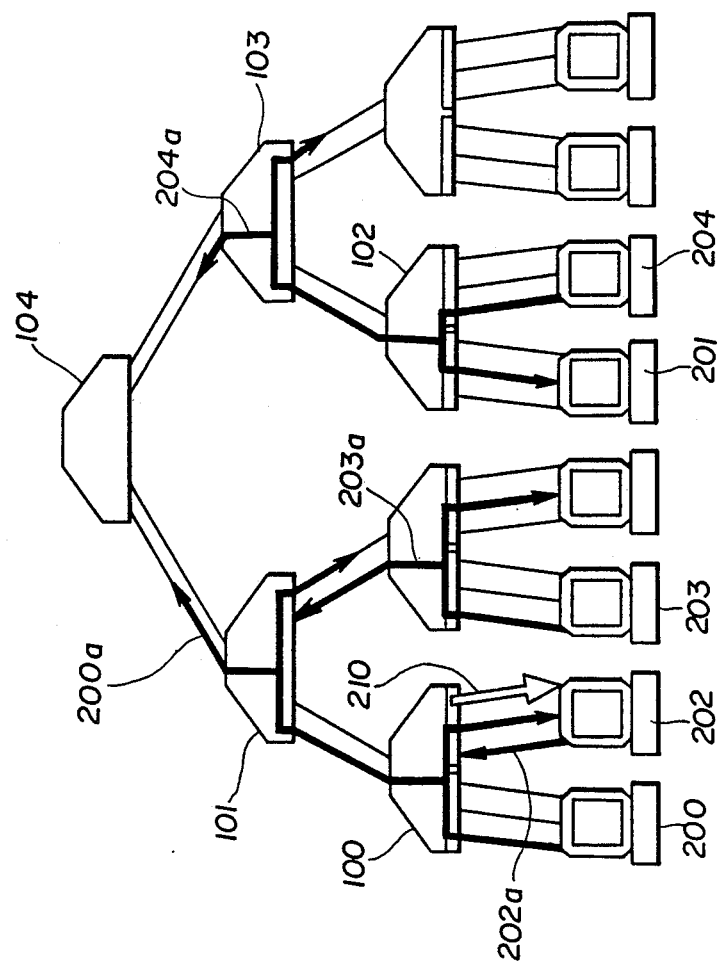
FIGS. 7A and 7B are system block diagrams respectively for explaining a fundamental operation of the node apparatus in the communication network shown in FIG. 2.

Next, a description will be given of the fundamental operation of the communication network shown in FIG. 2 by referring to FIGS. 7A and 7B. In FIG. 7A, it is assumed that terminal devices 202, 203 and 204 respectively transmit message packets 202a, 203a and 204a approximately at the same time as when a terminal device 200 transmits a message packet 200a to a terminal device 201.

In a lowest order node apparatus 100 and an intermediate node apparatus 101, the message packet 200a related to the terminal device 200 becomes the first received input signal. Accordingly, the message packet 200a is outputted from the low order direction ports 4 of these node apparatuses 100 and 101. In addition, in a lowest order node apparatus 102 and an intermediate node apparatus 103, the message packet 204a related to the terminal device 204 becomes the first received input signal. Thus, the message packet 204a is outputted from the low order direction ports 4 of these node apparatuses 102 and 103 and reaches the terminal device 201.

When the node apparatus 100 receives the message packet 202a from the terminal device 202, the node apparatus 100 supplies a collision signal 210 to the terminal device 202.

Figure 7B:
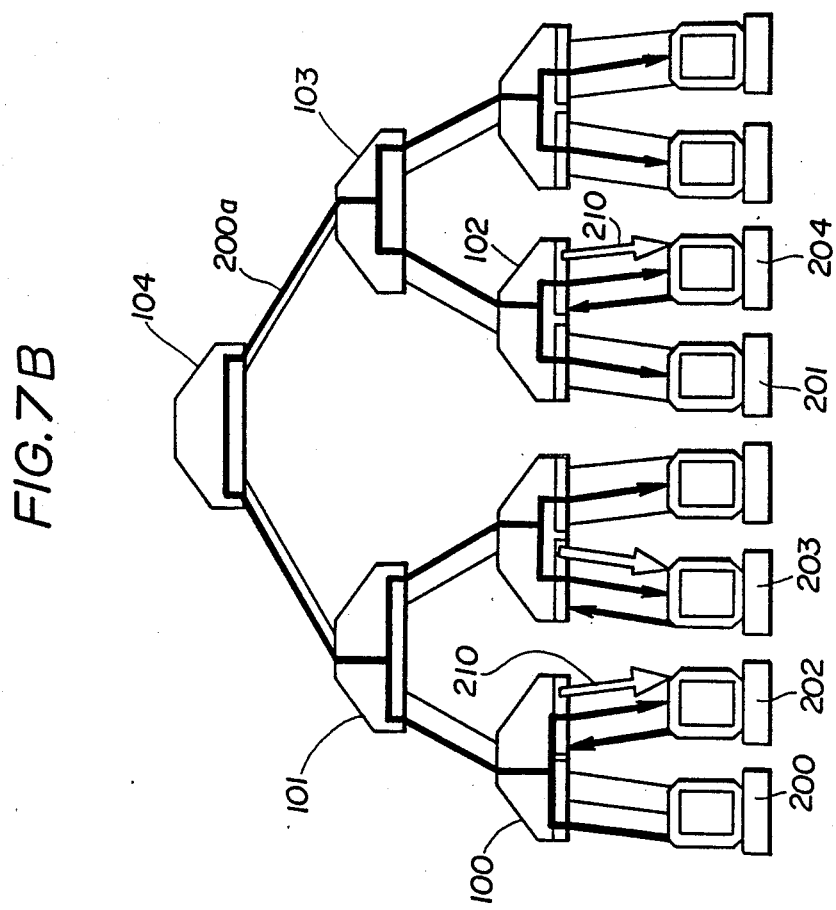

When it is assumed that the message packet 200a is the first received input signal at a highest order node apparatus 104, this message packet 200a is outputted from the low order direction port 4 of the node apparatus 104 as shown in FIG. 7B. The message packet 200a is received at the high order direction ports 3 of the node apparatuses 102 and 103. Thus, the message packet 200a is outputted from the low order direction ports 4 of these node apparatuses 102 and 103 in place of the message packet 204a and is received by the terminal device 201. As a result, the message packet 200a which is the first received input signal at the node apparatus 104 is received by the terminal device 201 even when transmissions of other message packets such as the message packet 204a are made. In other words, the message packet 200a which reaches the highest order node apparatus 104 first is broadcasted within the communication network.

When the switches 73 and 74 of the sequence control part 70 are turned OFF, the switching control unit 5 carries out the following modified operation. One of the objects of this modified operation is to enable the full duplex communication. In other words, the full duplex communication is enabled when a signal is received at the low order direction input port 4 by coupling the high order direction input port and at least the low order direction output port 4 which corresponds to the first receiving low order direction input port 4 after the first predetermined time elapses from the detection of the signal at the first receiving low order direction input port 4. Of course, the signals in both directions are supervised to detect the end of the communication.

Another object of the modified operation is to prevent the erroneous operation of the decoder included in the network interface unit of the terminal device 2, that is, to carry out the phase lock prevent function. This object is achieved by adding a high-level signal as the second predetermined signal for the first predetermined time to the signal at the low order direction output port 4 which is at least connected to the terminal device 2 and is other than the low order direction output port 4 corresponding to the first receiving low order direction input port 4 when the first receiving low order direction input port 4 is detected. Hence, it is possible to prevent the erroneous operation of the decoder of the network interface unit of the terminal device 2, and in addition, there is no need to impose special restrictions or to make special modifications on the terminal device 2.

When the first received input signal is received at the high order direction input channel 6a, the first input channel detecting part 30 sets all outputs thereof to the low level and the switching gate part 40 prohibits all inputs from the low order direction input channels 7a, regardless of whether or not an input signal exists at the low order direction input channels 7a. The sequence control part 70 carries out a control so that the second predetermined signal (high-level signal) is outputted from all of the low order direction input channels 7a for the first predetermined time starting from the detection of the first receiving input channel. In this state, when a signal exists at a low order direction input channel 7a, the input signal detecting part 20 sets a corresponding output to the low level and the collision detecting part 60 outputs the collision signal 210 from a corresponding collision signal channel 7c.

When a time approximately equal to the second predetermined time elapses from the detection of the first receiving input channel, the sequence control part 70 sets all outputs of the first input channel detecting part 30 to the high level and permits inputs from all of the low order direction input channels 7a so as to enable the full duplex communication. In this embodiment, the first predetermined time is used as in the case where the first received input signal is received at the low order direction input channel 7a in place of a second time constant.

When the first received input signal is received at one of the low order direction input channels 7a, the first input channel detecting part 30 sets a corresponding output to the high level and sets remaining outputs to the low level, while the switching gate part 40 prohibits inputs from the low order direction input channels 7a other than the first receiving input channel. The sequence control part 70 carries out a control to output the second predetermined signal (high-level signal) from all of the low order direction output channels 7b for the first predetermined time starting from the detection of the first receiving input channel. In this state, when a signal exists at a low order direction input channel 7a, the input signal detecting part 20 sets a corresponding output to the low level, and the collision detecting part 60 outputs the collision signal 210 from a corresponding collision signal channel 7c.

When a time approximately equal to the first predetermined time elapses from the detection of the first receiving input channel, the sequence control part 70 sets all outputs of the first input channel detecting part 30 to the high level and permits inputs from all of the low order direction input channels 7a so as to enable the full duplex communication.

Next, a description will be given of the modified operation of the communication network by referring to FIGS. 8A, 8B and 8C. It is assumed for convenience' sake that the first packet is transmitted in the same manner as the case shown in FIG. 7A.

In the node apparatuses 100 and 101, the message packet 200a is the first received input signal and this message packet 200a is outputted from the low order direction ports 4 of these node apparatuses 100 and 101. In addition, in the node apparatuses 102 and 103, the other message packet 204a is the first received input signal. The message packet 204a is outputted from the low order direction ports 4 of these node apparatuses 102 and 103 and reaches the terminal device 201. In this state, a collision of the message packets 200a and 202a occurs at the lowest order node apparatus 100 as shown in FIG. 8A and the collision signal 210 is supplied to the terminal device 202. Consequently, the collision signal 210 overlaps the message packet 200a and the signal received by the terminal device 202 is maintained at the high level. For this reason, the decoder within the network interface unit of the terminal device 202 such as a decoder in conformance with the Manchester coding system will not operate, and the terminal device 202 will not synchronize in phase to the invalid message packet 200a.

Figure 8B:
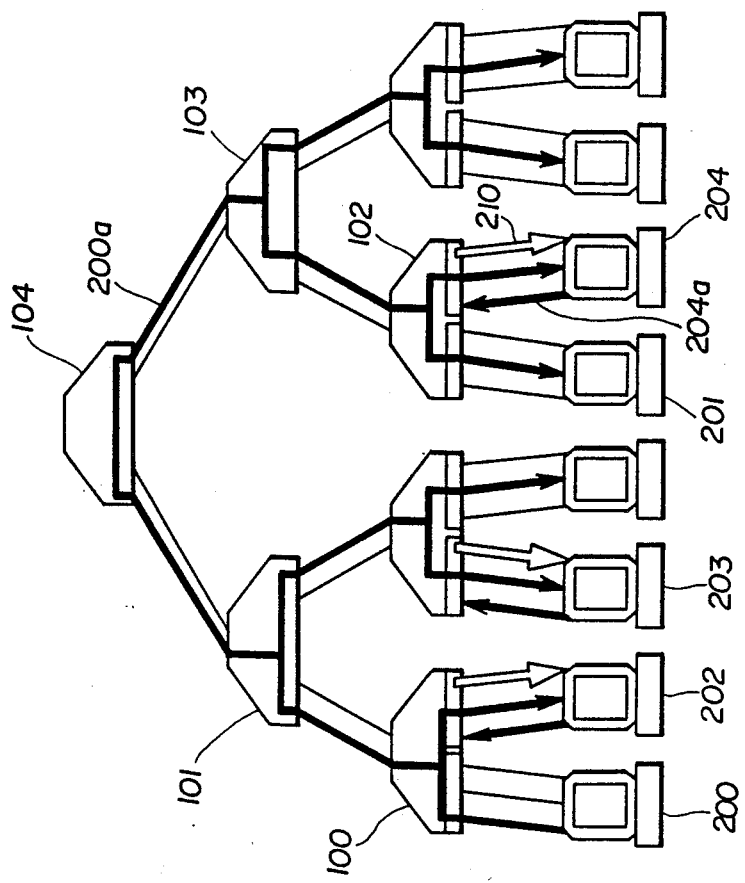
Figure 8C:
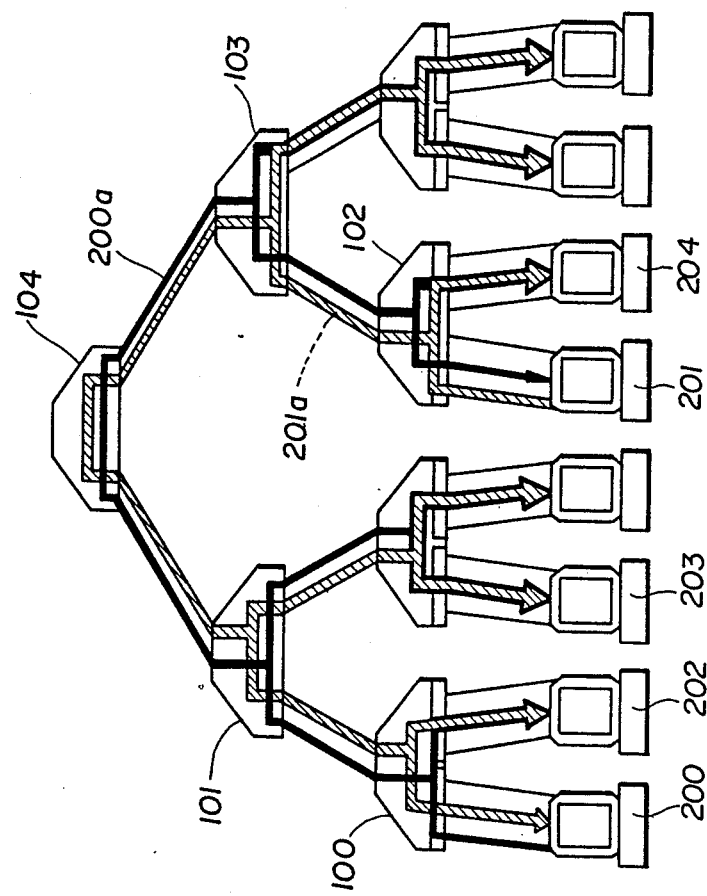

When the message packet 200a is the first received input signal at the node apparatus 104, this message packet 200a is outputted from the low order direction port 4 of the node apparatus 104 as shown in FIG. 8B. This message packet 200a is received at the high order direction ports 3 of the node apparatuses 102 and 103. Thus, the message packet 200a is outputted from the low order direction ports 4 of the node apparatuses 102 and 103 in place of the message packet 204a and is received by the terminal device 201.

The signal initially received by the terminal device 201 is the overlapping collision signal 201 and message packet 204a. However, when the collision signal 210 ceases, the signal received by the terminal device 201 is a preamble portion of the message packet 200a. As a result, the decoder of the network interface unit of the terminal device 201 first synchronizes in phase to this preamble portion of the message packet 200a.

Among generally available decoders for the network interface unit, there are decoders which do not synchronize in phase for a certain time once in phase synchronism, even when the present signal ceases and a next signal starts. But by providing the switch 73 in the sequence control part 70, the node apparatus 1 can effectively cope with the terminal device having a network interface unit including such a decoder.

The message packet 200a which becomes the first received input signal in the node apparatus 104 is received by the terminal device 201 even when transmissions of other message packets such as the message packet 204a are made.

Since the full duplex communication is enabled, it is possible to use a terminal device having the full duplex communication function for all of the terminal devices 2. When the terminal device 201 transmits an acknowledge packet 201a such as an acknowledge (ACK) or not acknowledge (NACK), this acknowledge packet 201a is correctly received by the transmitting (source) terminal device 200. But in the other terminal devices, the message packet 200a overlaps the acknowledge packet 201a and these other terminal devices cannot correctly receive the signal as indicated by hatchings in FIG. 8C.

Therefore, according to this embodiment, after the first or second predetermined time elapses from the detection of the signal received at the high order direction input port 3, the switching control unit 5 connects the low order direction input port 4 to which no input signal is received or all of the low order direction input ports 4 and the high order direction output ports 3. As a result, the full duplex communication is enabled when the signal is received at the high order direction input port 3.

The described embodiment is suitably designed for the Ethernet LAN, but it is of course possible to modify the system to suit a star-shaped LAN, for example. In this case, the terminal control module 4b is designed to overlap the signals at the low order direction output channels 7b and the collision signal channels 7c. In addition, when independently designing the network interface unit of the terminal device 2, it is possible to provide the functions of the terminal control module 4b in the network interface unit. In this case, the low order direction port 4 of the node apparatus 1 only includes the node control module 4a for the low order direction. Furthermore, it is possible to provide the function of generating the second predetermined signal within the network interface unit.

Figure 1:
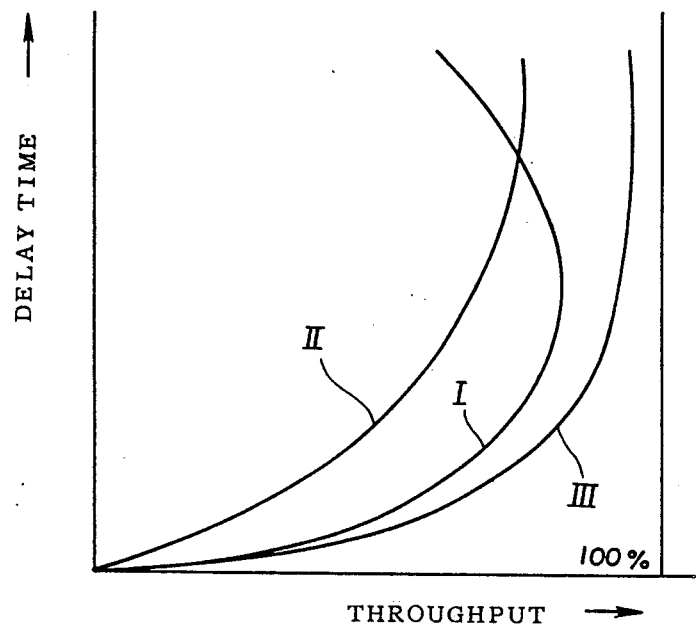
FIG. 1 shows throughput versus delay time characteristics of two typical LANs together with a throughput versus delay time characteristic obtainable with the present invention.

Therefore, according to this embodiment, the IEEE 802.3 standard of the existing Ethernet and star-shaped LANs can be satisfied, and at the same time, it is possible to obtain a high throughput and superior throughput versus delay time characteristic compared to those of such existing systems. In FIG. 1, a curve III indicates the throughput versus delay time characteristic obtainable by the embodiment. The embodiment is also advantageous in that compatibility is maintained with the network interface unit which is in conformance with the existing protocol, and there is no need to modify the network interface unit.

Furthermore, the present invention is not limited to these embodiments, but various variations and modifications may be made without departing from the scope of the present invention.

What is claimed is:

1. A node apparatus for a communication network having a hierarchical structure, said communication network having a plurality of transmission paths each coupling one node apparatus to another node apparatus or a terminal device, said node apparatus comprising:
at least one high order direction port having input and output channels for coupling said node apparatus to an arbitrary node apparatus which is provided in a layer which is higher in order than a layer in which said node apparatus is provided;
a plurality of low order direction ports respectively having input and output channels for coupling said node apparatus to an arbitrary node apparatus or an arbitrary terminal device which is provided in a layer which is lower in order than the layer in which said node apparatus is provided; and
control means for controlling coupling of said high order direction port and said low order direction ports,
when no signal is received at the input channel of said high order direction port and a signal is first received at the input channel of one of said low order direction ports said control means coupling the input channel of said one low order direction port to the output channels of remaining low order direction ports and said high order direction port and disconnecting the input channels of the remaining low order direction ports from the output channels of all of said low order direction ports and said high order direction port,
when a signal is first received at the input channel of said high order direction port said control means coupling the input channel of said high order direction port to the output channels of all of said low order direction ports and disconnecting the input channels of all of said low order direction ports from the output channels of all of said low order direction ports and said high order direction port regardless of whether or not a signal is received at an input channel of one of said low order direction ports.

2. The node apparatus as claimed in claim 1 wherein said control means includes first input channel detecting means coupled to the input channels of said high order direction port and said low order direction ports for detecting a first receiving input channel which receives a signal first out of the input channels of said high order direction port and said low order direction ports, input signal detecting means for detecting whether or not the input channels of said high order direction port and said low order direction ports receive signals from the transmission paths, switching gate means coupled to the output channels of said high order direction port and said low order direction ports for controlling the coupling of said high order direction port and said low order direction ports responsive to outputs of said first input channel detecting means and said input signal detecting means, and sequence control means for controlling operation sequences of said first input channel detecting means, said input signal detecting means and said switching gate means.

3. The node apparatus as claimed in claim 2 wherein said control means further includes collision detecting means coupled to at least one collision signal channel for detecting a collision of signals, said collision detecting means detecting whether or not a signal exists at corresponding input and output channels of an arbitrary low order direction port for a first predetermined time from a time when said signal detecting means detects a signal received by the input channel of said arbitrary low order direction port and supplying through the collision signal channel a collision signal which indicates an occurrence of the collision to a terminal device which is coupled to said node apparatus through said arbitrary low order direction port when a signal exists at both the corresponding input and output channels of said arbitrary low order direction port.

4. The node apparatus as claimed in claim 3 wherein said first predetermined time is set to a network time constant of the communication network.

5. The node apparatus as claimed in claim 2 wherein said control means further includes communication end detecting means coupled to said switching gate means for detecting an end of a communication when signals cease at the input channels of both said high order direction port and said low order direction ports, said communication end detecting means initializing the coupling between said high order direction port and said low order direction ports when the end of the communication is detected.

6. The node apparatus as claimed in claim 1 wherein said control means includes collision detecting means coupled to at least one collision signal channel for detecting a collision of signals, said collision detecting means detecting whether or not a signal exists at corresponding input and output channels of an arbitrary low order direction port for a first predetermined time from a time when said signal detecting means detects a signal received by the input channel of said arbitrary low order direction port and supplying through the collision signal channel a collision signal which indicates an occurrence of the collision to a terminal device which is coupled to said node apparatus through said arbitrary low order direction port when a signal exists at both the corresponding input and output channels of said arbitrary low order direction port.

7. The node apparatus as claimed in claim 6 wherein said high order direction port comprises a node control module and said low order direction ports comprise an arbitrary number of node control modules respectively for coupling to a node apparatus and an arbitrary number of terminal control modules respectively for coupling to a terminal device, each of said terminal control modules including the collision signal channel and a collision signal transmitting part for converting the collision signal into a predetermined signal in conformance with a system employed by the terminal device which is coupled to said node apparatus through said arbitrary low order direction port.

8. The node apparatus as claimed in claim 1 wherein said control means includes communication end detecting means for detecting an end of a communication when signals cease at the input channels of both said high order direction port and said low order direction ports, said communication end detecting means initializing the coupling between said high order direction port and said low order direction ports when the end of the communication is detected.

9. The node apparatus as claimed in claim 1 wherein said control means couples at least the input channel of said high order direction port and an output channel of one of said low order direction ports which corresponds to an input channel which received a signal first out of the input channels of said low order direction ports after a first predetermined time from a time when the first received signal is detected.

10. The node apparatus as claimed in claim 9 wherein said first predetermined time is set to a network time constant of the communication network.

11. The node apparatus as claimed in claim 9 wherein said control means couples at least the input channels of all of said low order direction ports and the output channel of said high order direction port after a second predetermined time from a time when a signal is detected at the input channel of said high order direction port.

12. The node apparatus as claimed in claim 11 wherein said second predetermined time is set to a link time constant of the communication network.

13. The node apparatus as claimed in claim 1 wherein said control means adds a second predetermined signal to a signal at an output channel of a certain low order direction port which is at least coupled to a terminal device when a signal is first received at an input channel of a specific one of said low order direction ports, said output channel of said certain low order direction port being other than an output channel corresponding to the input channel of said specific low order direction port.

14. A communication network having a hierarchical structure, said communication network comprising:
a plurality of node apparatuses provided in a different layers of the hierarchical structure;
a plurality of terminal devices; and
a plurality of transmission paths each coupling one node apparatus to another node apparatus or one terminal device,
each of said node apparatuses comprising at least one high order direction port having input and output channels for coupling said node apparatus to an arbitrary node apparatus which is provided in a layer which is higher in order than a layer in which said node apparatus is provided, a plurality of low order direction ports respectively having input and output channels for coupling said node apparatus to an arbitrary node apparatus or an arbitrary terminal device which is provided in a layer which is lower in order than the layer in which said node apparatus is provided, and control means for controlling coupling of said high order direction port and said low order direction ports,
when no signal is received at the input channel of said high order direction port and a signal is first received at the input channel of one of said low order direction ports said control means coupling the input channel of said one low order direction port to the output channels of remaining low order direction ports and said high order direction port and disconnecting the input channels of the remaining low order direction ports from the output channels of all of said low order direction ports and said high order direction port, when a signal is first received at the input channel of said high order direction port said control means coupling the input channel of said high order direction port to the output channels of all of said low order direction ports and disconnecting the input channels of all of said low order direction ports from the output channels of all of said low order direction ports and said high order direction port regardless of whether or not a signal is received at an input channel of one of said low order direction ports, said node apparatuses cooperating so that when a plurality of signals are transmitted from said terminal devices approximately at the same time one of the signals which first reaches a predetermined node apparatus provided in a highest order layer is broadcasted within the communication network and remaining signals are eliminated.

15. The communication network as claimed in claim 14 wherein said control means of said predetermined node apparatus couples an input channel of a certain one of said low order direction ports to the output channels of remaining low order direction ports when a signal is first received at the input channel of said certain low order direction port and disconnects the input channels of the remaining low order direction ports from the output channels of said high order direction port and said low order direction ports.

16. The communication network as claimed in claim 14 wherein said control means includes first input channel detecting means coupled to the input channels of said high order direction port and said low order direction ports for detecting a first receiving input channel which receives a signal first out of the input channels of said high order direction port and said low order direction ports, input signal detecting means for detecting whether or not the input channels of said high order direction port and said low order direction ports receive signals from the transmission paths, switching gate means coupled to the output channels of said high order direction port and said low order direction ports for controlling the coupling of said high order direction port and said low order direction ports responsive to outputs of said first input channel detecting means and said input signal detecting means, and sequence control means for controlling operation sequences of said first input channel detecting means, said input signal detecting means and said switching gate means.

17. The communication network as claimed in claim 16 wherein said control means further includes collision detecting means coupled to at least one collision signal channel for detecting a collision of signals, said collision detecting means detecting whether or not a signal exists at corresponding input and output channels of an arbitrary low order direction port for a first predetermined time from a time when said signal detecting means detects a signal received by the input channel of said arbitrary low order direction port and supplying through the collision signal channel a collision signal which indicates an occurrence of the collision to a terminal device which is coupled to said node apparatus through said arbitrary low order direction port when a signal exists at both the corresponding input and output channels of said arbitrary low order direction port.

18. The communication network as claimed in claim 17 wherein said first predetermined time is set to a network time constant of the communication network.

19. The communication network as claimed in claim 16 wherein said control means further includes communication end detecting means coupled to said switching gate means for detecting an end of a communication when signals cease at the input channels of both said high order direction port and said low order direction ports, said communication end detecting means initializing the coupling between said high order direction port and said low order direction ports when the end of the communication is detected.

20. The communication network as claimed in claim 14 wherein said control means includes collision detecting means coupled to at least one collision signal channel for detecting a collision of signals, said collision detecting means detecting whether or not a signal exists at corresponding input and output channels of an arbitrary low order direction port for a first predetermined time from a time when said signal detecting means detects a signal received by the input channel of said arbitrary low order direction port and supplying through the collision signal channel a collision signal which indicates an occurrence of the collision to a terminal device which is coupled to said node apparatus through said arbitrary low order direction port when a signal exists at both the corresponding input and output channels of said arbitrary low order direction port.

21. The communication network as claimed in claim 20 wherein said high order direction port comprises a node control module and said low order direction ports comprise an arbitrary number of node control modules respectively for coupling to a node apparatus and an arbitrary number of terminal control modules respectively for coupling to a terminal device, each of said terminal control modules including the collision signal channel and a collision signal transmitting part for converting the collision signal into a predetermined signal in conformance with a system employed by the terminal device which is coupled to said node apparatus through said arbitrary low order direction port.

22. The communication network as claimed in claim 14 wherein said control means includes communication end detecting means for detecting an end of a communication when signals cease at the input channels of both said high order direction port and said low order direction ports, said communication end detecting means initializing the coupling between said high order direction port and said low order direction ports when the end of the communication is detected.

23. The communication network as claimed in claim 14 wherein said control means couples at least the input channel of said high order direction port and an output channel of one of said low order direction ports which corresponds to an input channel which received a signal first out of the input channels of said low order direction ports after a first predetermined time from a time when the first received signal is detected.

24. The communication network as claimed in claim 23 wherein said first predetermined time is set to a network time constant of the communication network.

25. The communication network as claimed in claim 23 wherein said control means couples at least the input channels of all of said low order direction ports and the output channel of said high order direction port after a second predetermined time from a time when a signal is detected at the input channel of said high order direction port.

26. The communication network as claimed in claim 25 wherein said second predetermined time is set to a link time constant of the communication network.

27. The communication network as claimed in claim 14 wherein said control means adds a second predetermined signal to a signal at an output channel of a certain low order direction port which is at least coupled to a terminal device when a signal is first received at an input channel of a specific one of said low order direction ports, said output channel of said certain low order direction port being other than an output channel corresponding to the input channel of said specific low order direction port.

* * * * *